United States Patent
Wu

(10) Patent No.: US 9,477,489 B1
(45) Date of Patent: Oct. 25, 2016

(54) SOFTWARE BASED SELF-ENCRYPTING DRIVE (SED) SLEEP RESUMING METHOD

(71) Applicant: DELL PRODUCTS L.P., Round Rock, TX (US)

(72) Inventor: Dongli Wu, Allen, TX (US)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 14/795,781

(22) Filed: Jul. 9, 2015

(51) Int. Cl.
*G06F 1/32* (2006.01)
*G06F 9/44* (2006.01)

(52) U.S. Cl.
CPC ........... *G06F 9/4418* (2013.01); *G06F 1/3228* (2013.01); *G06F 1/3246* (2013.01); *G06F 9/4408* (2013.01)

(58) Field of Classification Search
CPC .. G06F 9/4418; G06F 1/3228; G06F 1/3246; G06F 9/4408
See application file for complete search history.

(56) References Cited

U.S. PATENT DOCUMENTS

2008/0222661 A1* 9/2008 Belyakov ................ H04L 69/40
719/321

* cited by examiner

*Primary Examiner* — Idriss N Alrobaye
*Assistant Examiner* — Ronald Modo
(74) *Attorney, Agent, or Firm* — Jackson Walker LLP; Christopher J. Rourk

(57) ABSTRACT

A method that can stably and reliably resume SED from operating system power saving mode is disclosed. The solution comprises a storage lower filter driver and an extra external SCSI I/O queue. The storage lower filter driver is coupled to the storage class driver and configured to provide a SED power saving transaction in response to an operation system power function. An extra external SCSI queue and correspondingly a unique SCSI I/O queue state machine trigger mechanism are included in order to avoid overwhelming the capability of any particular host adapter. A dummy SCSI package is inserted into internal SCSI queue in last phase of operating system power down transaction so that internal SCSI queue can be activated during operation system power resuming.

18 Claims, 2 Drawing Sheets

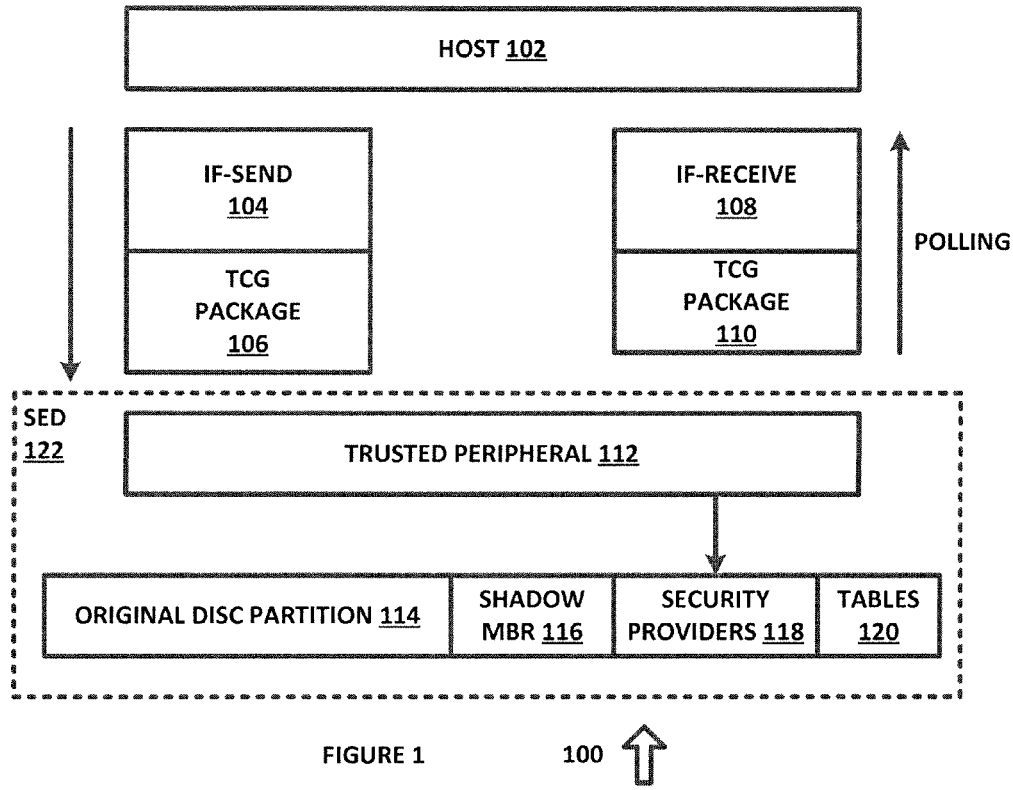
FIGURE 1    100
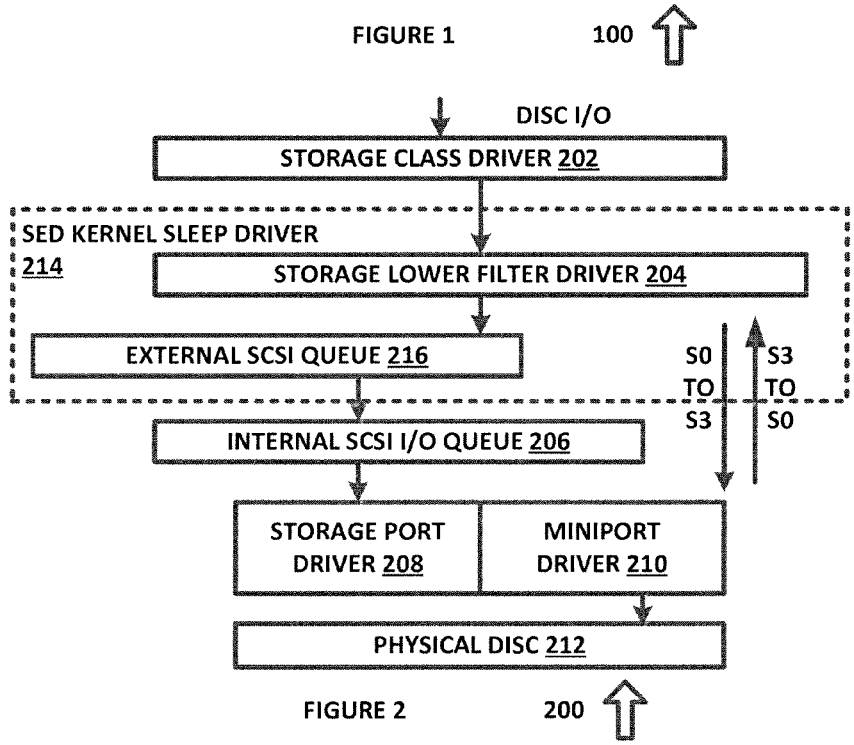
FIGURE 2    200

US 9,477,489 B1

SOFTWARE BASED SELF-ENCRYPTING DRIVE (SED) SLEEP RESUMING METHOD

TECHNICAL FIELD

The present disclosure relates generally to data encryption, and more specifically to a solution for a Self-Encrypting Drive that prevents system freezing or crashing from occurring due to a transition of an operating system power saving state.

BACKGROUND OF THE INVENTION

A Self-Encrypting Drive (SED) provides for secure data encryption and protection by using a circuit built into the disk driver controller chip. However, when used with an operating system that has power saving functions that shut down the operating system when it is not being utilized by a user, the SED can cause the system to freeze up or crash during system power resumption. As a result, system functionality is constrained and user experiences are adversely impacted.

SUMMARY OF THE INVENTION

A method that can stably and reliably resume SED from operating system power saving mode is disclosed. The solution comprises a storage lower filter driver and an extra external SCSI I/O queue. The storage lower filter driver is coupled to the storage class driver and configured to provide an SED power saving transaction in response to an operation system power saving function. An extra external SCSI queue and a corresponding unique SCSI I/O queue state machine trigger mechanism are included in order to avoid overwhelming the capability of any particular host adapter. A dummy SCSI request is inserted into internal SCSI queue in last phase of the operating system power down transaction so that the internal SCSI queue can be activated when the operating system power resumes.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views, and in which:

FIG. 1 is a diagram of a TCG Opal-compliant SED architecture in accordance with an exemplary embodiment of the present disclosure;

FIG. 2 is a diagram of a general storage stack with SED power resumption capability, in accordance with an exemplary embodiment of the present disclosure.

DETAILED DESCRIPTION OF THE INVENTION

Figure 3:
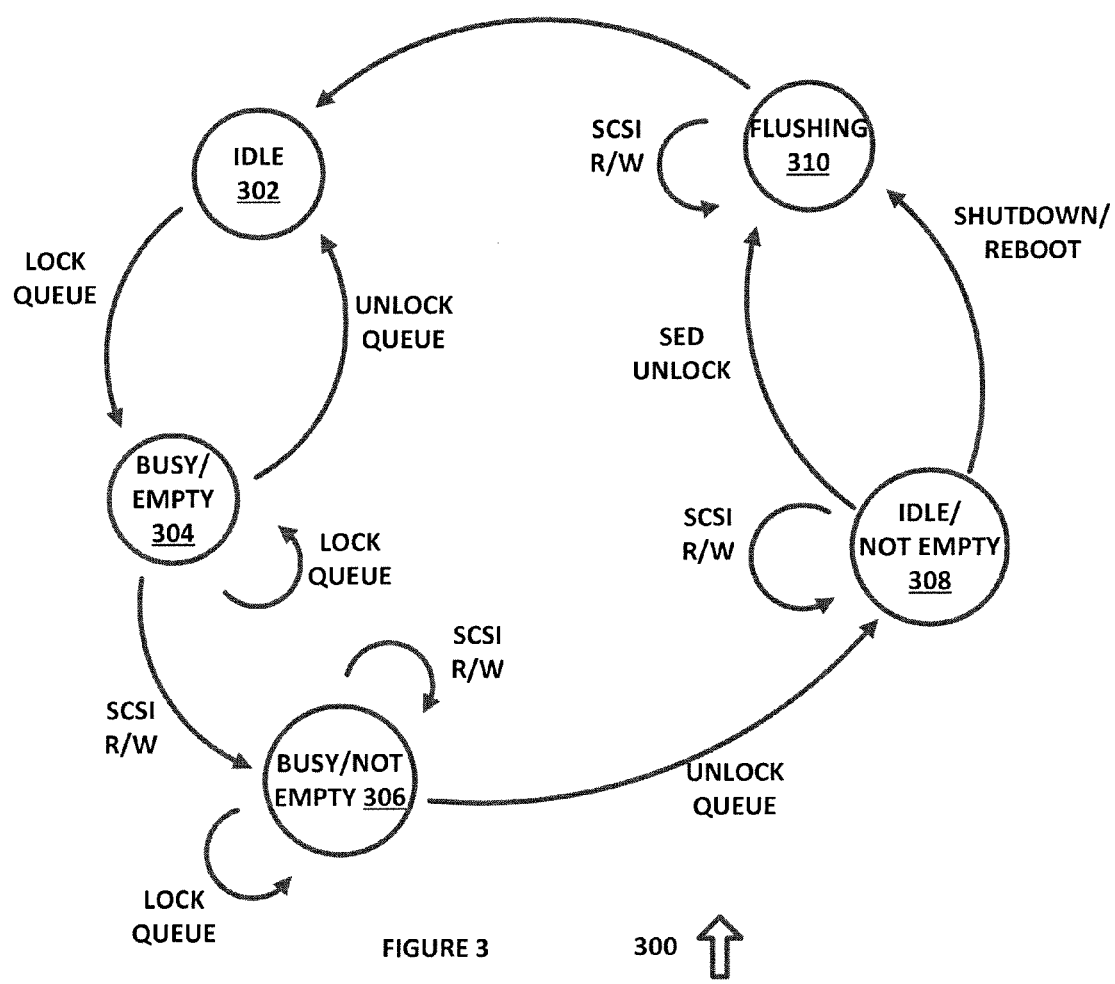
FIG. 3 is a state machine diagram for the extra external SCSI queue in an SED power resumption capability filter driver, in accordance with an exemplary embodiment of the present disclosure.

In the description that follows, like parts are marked throughout the specification and drawings with the same reference numerals. The drawing figures might not be to scale and certain components can be shown in generalized or schematic form and identified by commercial designations in the interest of clarity and conciseness.

A Self-encrypting Drive (SED) is a storage device which is based on Trusted Computing Group (TCG) specifications that enable integrated encryption and access control within the protected hardware of the storage device. The SED provides the industry's preferred solution for full disk encryption, and protects data when the machines or drives are lost or stolen, as well as re-purposed, during a warranty repair, and at the end-of-life. For SED management, a method that can stably and reliably resume the SED from an operating system power saving mode is highly desirable.

FIG. 1 is a diagram of a system 100 for a TCG Opal-compliant SED architecture, in accordance with an exemplary embodiment of the present disclosure. System 100 includes host 102 and SED 122, which further includes trusted peripheral 112, original disk partition 114, shadow MBR 116, security providers 118 and tables 120, each of which can be implemented in hardware built into disk controller or in other suitable manners.

Host 102 communicates with security providers 118 using a suitable process, such as a TCG IF-SEND command 104 or a TCG IF-RECEIVE command 108, via trusted peripheral 112. Security providers 118 include a set of tables 120 and associated methods discussed herein that control a persistent trust state of security providers 118. Tables 120 provided by security providers 118 include an MBR control table, an encryption table, a locking table and other suitable tables.

The MBR control table is used to control shadow MBR 116. When shadow MBR 116 is active, trusted peripheral 112 responds to a logical block addressing (LBA) request that maps the LBA request to the end of the MBR control table with values from the MBR control table. The encryption table is used to control how the disk is encrypted. The locking table is used to provide a locking feature during an SED 122 power state transaction. When SED 122 loses power, the locking table can be used to control SED 122 to transition into a locking state. When SED disk 122 is locked, trusted peripheral 112 responds to an LBA request from LBA 0 to LBA n with all zeroes or "no data," depending on locking table settings.

FIG. 2 is a diagram of a general Windows storage stack 200 with SED power resumption capability, in accordance with an exemplary embodiment of the present disclosure. General Windows storage stack 200 includes storage class driver 202, storage port driver 208 and miniport driver 210, each of which can be implemented in a suitable combination of hardware and software or in other suitable manners.

Storage class driver 202 can be implemented as a driver that operates on the top of the storage stack. One of the associated functions of storage class driver 202 is to convert a disk I/O request from a file system format into a suitable data bus format, such as an SCSI format, and then to send the I/O request to storage port driver 208. Storage class driver 202 can also transfer a Windows power request to storage port driver 208 during a sleep transaction, and can perform other suitable functions.

Storage port driver 208 and miniport driver 210 can be responsible for executing physical disk read/write functions. As storage HBAs vary greatly in the volume of I/O requests that they can handle, internally, storage port driver 208 maintains a data bus queue, such as an SCSI queue 206, to meet predetermined disk performance requirements. While an SCSI data bus is described in the exemplary embodiments disclosed herein, other suitable data buses can also or alternatively be used.

For a Windows sleep transaction, a power down sequence can occur in a top to bottom sequence, meaning that the higher level components power down first and are followed by the lower level components. Likewise, a power up sequence can occur in a bottom to top sequence.

When storage port driver 208 receives a Windows sleep request, it will save the SCSI request converted from storage class driver 202 into internal SCSI I/O queue 206 and can put itself into a sleep mode. When the system resumes from sleep, the power up sequence will typically start from bottom to top. Storage port driver 208 can be resumed first and can start to send SCSI I/O from SCSI I/O queue 206 to physical disk drive 212.

In general, the Windows storage stack 200, if physical disk 212 is an SED, doesn't function properly due to the conflict between general Windows storage stack 200 and SED 122. On the general Windows storage stack, storage port driver 208 will wake up first and start to process SCSI data packets from SCSI I/O queue 206, which is maintained during sleep resumption. On the other side, when the SED 122 loses power in the transition to a sleep mode, trusted peripheral 112 can use a locking table in tables 120 of security providers 118 to reset the SED drive into a locked state. When resuming normal operations from the sleep, trusted peripheral 112 responds to the original LBA request from LBA 0 to LBA n with an all zero or "no data" response, depending on locking table setting. As a result, the SED 122 can result in system freezing or crashing during system power resuming. Accordingly, system functionalities are constrained and the user experience can be compromised.

In order to allow the SED 122 to function properly with the general Windows storage stack 200 during a sleep power transaction, an SED kernel sleep driver 214 can be inserted between storage class driver 202 and storage port driver 208, which comprises a storage lower filter driver 204 and an extra external SCSI I/O queue 216 maintained by the storage lower filter driver 204. Storage lower filter driver 204 can perform a number of functions. First, storage lower filter driver 204 can redirect the SCSI requests converted by storage class driver 202 into external SCSI I/O queue 216 during Windows power down transaction. In this manner, storage port driver 208 does not have SCSI requests processed during resumption from sleep. Second, storage lower filter driver 204 can insert a dummy SCSI request into internal SCSI I/O queue 206 during last phase of a Windows power down transaction. That way, internal SCSI I/O queue 206 can be woken up during Windows power up transition even though the regular SCSI requests converted by storage class driver 202 are redirected into external SCSI queue 216. Third, storage filter driver 204 can act as host 102 and communicate with trusted peripheral 112 when resuming normal operations from a sleep state and can reset the SED drive 122 from a lock state to an unlock state. As a result, SED drive 122 will act as a normal drive after the general storage stack functionality is resumed from sleep.

When SED drive 122 is set back to the unlocked state successfully, storage lower filter driver 204 can transfer SCSI requests in external SCSI I/O queue 216 into internal SCSI I/O queue 206 so that Windows can work as normal. In this regard, the timing to redirect storage class driver 202 SCSI I/O request into external SCSI queue 216 can be critical. If the redirect timing happens too early, the system will not be able to complete the transition to a sleep state, because some of disk I/O will not be finished. Conversely, if the redirect timing happens too late, some SCSI I/O requests can be saved into internal SCSI I/O queue 206. Storage port driver 208 will start to process them while the SED drive 122 is still in a locked state during Windows power resuming. In order to avoid these problems, the state machine of external SCSI queue 216 is triggered by not only just Windows S0/S3 notification but also SRB_FUNCTION_LOCK_QUEUE/SRB_FUNCTION_UNLOCK_QUEUE from a storage class driver 202 power transaction pattern.

FIG. 3 a state machine diagram for an extra external SCSI queue 216 in SED kernel sleep driver 214, in accordance with an exemplary embodiment of the present disclosure. In one exemplary embodiment, the external SCSI I/O queue 216 can have four stable states and one transition state. These states are:

Idle 302: This state is where the SED works as a normal disk. SCSI I/O will be directly passed to the internal SCSI I/O queue 206. The SED kernel sleep driver 214 does not have any function in this state.

Busy/Empty 304: This state is where the SED kernel sleep driver 214 is working but external SCSI I/O queue 216 is empty.

Busy/Not Empty 306: This state is where the external SCSI I/O queue 216 is working, and the storage class driver is prepared to send an SCSI I/O request to internal SCSI I/O queue 206. As the SED kernel sleep driver 214 is working, the SCSI I/O is redirected into external SCSI I/O queue 216, and the internal SCSI I/O queue 206 in storage port driver 208 does not receive the SCSI I/O.

Idle/Not empty 308: This state is where the SED kernel sleep driver SCSI I/O is stopped but SCSI I/O is in the queue. In one exemplary embodiment, this state can wait on two conditions: 1) the SED disk to be unlocked, or 2) the whole system to be rebooted or restarted.

Flush 310: This state is where the SED kernel sleep driver SCSI I/O is in a transition state, at which time the SED drive is unlocked. The SCSI I/O data in the external SCSI I/O queue 216 will be transferred to the internal SCSI I/O queue 206 as fast as possible. After all SCSI I/O data are transferred, the SED kernel sleep driver SCSI I/O queue 216 will be restored to Idle 302.

The SED kernel sleep driver external SCSI I/O queue 216 can stay in one state until some events trigger a move to a new state. The events that can trigger the SED kernel sleep driver SCSI I/O queue state transition can come from the storage class driver or other suitable sources, and include the following exemplary events.

Locking Queue: the storage class driver can send a storage request block function lock queue request to the storage port driver to let the storage port driver lock down the SCSI queue.

Unlocking Queue: the storage class driver can send a storage request block function unlock queue request to the storage port driver to let the storage port driver unlock its SCSI queue.

SCSI R/W: The storage class driver can convert all of the disk I/O data from the file system into SCSIOP_READ or SCSIOP_WRITE packages and can send those data packages to the storage port driver.

The SED kernel driver SCSI I/O queue state transitions diagram reflects the result of how the SED kernel driver external SCSI I/O queue 216 can change general storage stack behavior, to allow the SED disk to go into sleep and to resume operation successfully. Regardless of the reason, such as for a transit power request or for other suitable purposes, as long as the storage class driver goes through the SCSI locking or unlocking sequence, the SED kernel driver SCSI I/O queue can go through the five state cycle and can finally return to an idle state. The idle state can be used as a single permanent stable state, or other suitable state configurations can also or alternatively be used.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A system for resuming a self-encrypting drive (SED) from an operating system power saving mode, comprising:
    a processor;
    an operation system (OS) with power saving capability configured to be executed by the processor;
    one or more SEDs, and
    a storage class driver configured to convert a disk input/output (I/O) request from a file system format into a data bus format;
    a storage filter driver coupled to the storage class driver and configured to perform an SED power save function in response to an operating system power save function; and
    a storage port driver coupled to the storage filter driver and configured to maintain a data bus queue associated with a physical storage device, wherein the storage filter driver coordinates data transfer between the storage class driver and the storage port driver;
    wherein the storage filter driver is configured to include an external SCSI queue that is configured to redirect requests converted by the storage class driver during the operating system power save function.

2. The system of claim 1 wherein an external SCSI queue state machine is configured to be triggered by a Windows SO/S3 notification.

3. The system of claim 2 wherein the external SCSI queue state machine is further configured to be triggered by an SRB_FUNCTION_LOCK_QUEUE function.

4. The system of claim 3 wherein the external SCSI queue state machine is further configured to be triggered by an SRB_FUNCTION_UNLOCKQUEUE function from a storage class driver power transaction pattern.

5. The system of claim 1 wherein the storage filter driver is configured to insert a dummy SCSI request into an internal SCSI queue in last phase of sleep power down transaction.

6. The system of claim 1 wherein the storage filter driver is configured to communicate with a trusted peripheral when resuming normal operation from the SED power save function.

7. The system of claim 1 wherein the storage filter driver is configured to reset an SED from a lock state to an unlock state when resuming normal operation from the SED power save function.

8. The system of claim 7 wherein the storage filter driver is configured to transfer SCSI requests from an external SCSI queue after resetting the SED from the lock state to the unlock state.

9. A method for resuming a self-encrypting drive (SED) from an operating system power saving mode, comprising:
    converting a disk input/output (I/O) request from a file system format into a data bus format;
    performing an SED power save function in response to an operating system power save function with a storage filter driver coupled to a storage class driver;
    maintaining a data bus queue associated with a physical storage device with a storage port driver coupled to the storage filter driver;
    coordinating data transfer between the storage class driver and a storage port driver; and
    redirecting requests converted by the storage class driver during the operating system power save function to an external SCSI queue.

10. The method of claim 9 further comprising triggering an external SCSI queue state machine with a Windows SO/S3 notification.

11. The method of claim 10 further comprising triggering the external SCSI queue state machine with an SRB_FUNCTION_LOCK_QUEUE function.

12. The method of claim 11 further comprising triggering the external SCSI queue state machine with an SRB_FUNCTION_UNLOCKQUEUE function from a storage class driver power transaction pattern.

13. The method of claim 9 further comprising inserting a dummy SCSI request into an internal SCSI queue.

14. The method of claim 13 wherein the dummy SCSI request is inserted into the internal SCSI queue in a last phase of a sleep power down transaction.

15. The method of claim 9 further comprising transferring data between the storage filter driver and a trusted peripheral when resuming operation from the SED power save function.

16. The method of claim 9 further comprising resetting an SED from a lock state to an unlock state when resuming operation from the SED power save function.

17. The method of claim 16 further comprising transferring SCSI requests from the external SCSI queue after resetting the SED from the lock state to the unlock state.

18. A system for resuming a self-encrypting drive (SED) from an operating system power saving mode, comprising:
    a processor;
    an operation system (OS) with power saving capability configured to be executed by the processor;
    one or more SEDs, and
    means for converting a disk input/output (I/O) request from a file system format into a data bus format;
    means for performing an SED power save function in response to an operating system power save function; and
    means for maintaining a data bus queue associated with a physical storage device, wherein a storage filter driver coordinates data transfer between a storage class driver and a storage port driver; and
    the storage filter driver is configured to include an external SCSI queue that is configured to redirect requests converted by the storage class driver during the operating system power save function.

\* \* \* \* \*